Nov. 28, 1972   W. W. GOTSHALL   3,704,276
PROCESS FOR THE PREPARATION OF ELASTOMERIC COMPOSITION
CONTAINING METHANOL TREATED CARBON BLACK
Filed Aug. 10, 1970
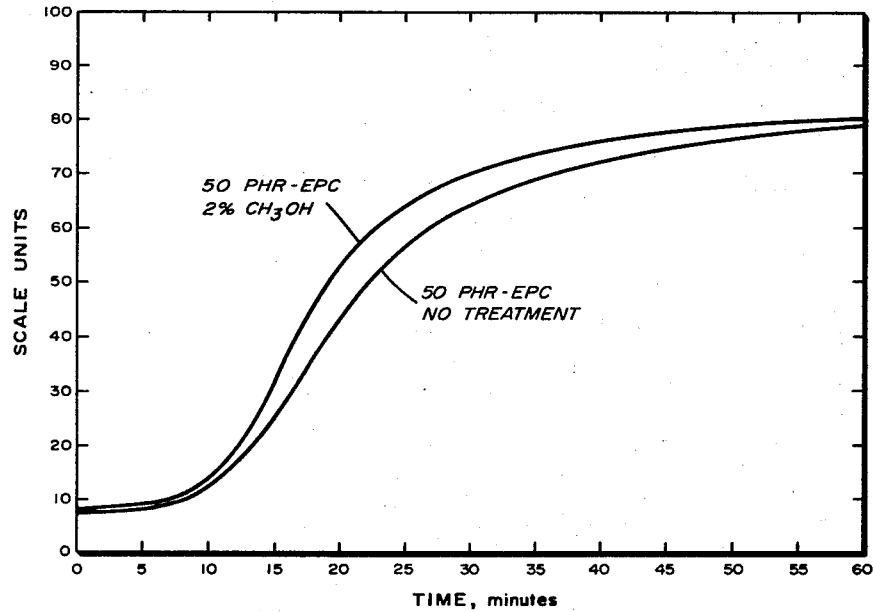
WITNESSES:
INVENTOR
WILLIAM W. GOTSHALL
BY:
ATTORNEY United States Patent Office 3,704,276
Patented Nov. 28, 1972

3,704,276
PROCESS FOR THE PREPARATION OF ELASTO-
MERIC COMPOSITION CONTAINING METHA-
NOL TREATED CARBON BLACK
William W. Gotshall, Orchard Lake, Mich., assignor to
Marathon Oil Company, Findlay, Ohio
Filed Aug. 10, 1970, Ser. No. 62,412
Int. Cl. C08c 11/02, 11/18; C08d 9/00
U.S. Cl. 260—41.5 R
9 Claims

ABSTRACT OF THE DISCLOSURE

Improvements in physical properties of vulcanizable elastomers containing carbon blacks having pH's below 7, e.g., channel blacks, can be achieved by mixing from about 0.25 to about 10% by weight of methanol with the carbon blacks before compounding of the elastomeric composition.

CROSS REFERENCES TO RELATED APPLICATIONS

U.S. patent application Ser. No. 666,011 filed Sept. 7, 1967 now refiled as Ser. No. 62,688 filed Aug. 10, 1970, Ser. No. 22,645, filed 1970, Ser. No. 22,647, filed 1970, relate to the general field of treatment of carbonaceous materials with methanol.

BACKGROUND OF THE INVENTION

(1) Field of the invention

The present invention relates to the general field of pigments (classified in U.S. Patent Office Class 106) and more particularly to subclass 307 thereof, "Elemental carbon-containing pigments, fillers, or aggregates." Rubber and other elastomeric compositions containing the carbon blacks of the present invention are classified in Class 260, subclass 763, "Vulcanizable natural hydrocarbon gums with elemental carbon filler, dye, or pigment."

(2) Description of the prior art

Carbon blacks having low pH often involve somewhat longer cure times and various techniques including principally chemical accelerators have been applied to shorten these cure times and increase production rates in vulcanizing operations. Such accelerators will usually involve relatively expensive and complex chemical compounds, e.g., mercaptobenzothiazole and have been directed primarily to the acceleration of cure rate of the vulcanizable compositions. Techniques for the production of master batches and more conventional vulcanizable elastomeric compositions from both natural and synthetic rubbers are taught in "Reinforcement of Elastomers" by Gerard Kraus, and also in "Introduction to Rubber Technology" by Maurice Morton.

"pH" as used herein refers to the pH of an aqueous slurry of the carbon black according to the techniques of standard test D-1516 of the American Society for Testing Materials.

SUMMARY

(1) General statement of the invention

The present invention, by utilizing methanol, a simple chemical compound readily available at low cost, not only speeds the rate of vulcanization and the corresponding output from production facilities, but in most instances, also offers the further advantage of markedly increased tensile strength, modulus, and elongation of the vulcanized elastomeric composition. The invention is applicable to carbon blacks having pH's below about 7, more preferably below about 6, and most preferably below about 5. Particularly preferred for use with the invention are channel blacks, e.g., easy processing channel blacks. Surprisingly, the choice of the particular alcohol, methanol, and the particular carbon blacks, low pH carbon blacks, involves a double criticality. It has been found that isopropyl alcohol, another simple and readily available alcohol having a chemical structure not greatly unlike that of methanol is not useful for the practice of the present invention. Also, as shown by the comparative examples, high abrasive furnace blacks, commonly available commercially used carbon blacks, are not useful in the practice of the invention.

(2) Utility of the invention

The vulcanized elastomeric compositions which are the ultimate product of the invention, are useful in a wide variety of elastomeric applications including mechanical rubber goods, tire carcasses, and tread stocks, rubber extrusions, and similar materials made from vulcanizable elastomers, such as natural and synthetic rubber, styrene-butadiene-copolymer (SBR), butadiene-acrilonitrile copolymer (Buna), butyl rubber, ethylene-propylene-diolefin terpolymers, polyisoprene, vulcanizable polymeric elastomeric material containing double bonds and derived from fluorinated or chlorinated or chlorofluorinated isoprenes.

BRIEF DESCRIPTION OF THE DRAWING

The drawing is a Monsanto rheograph which was produced according to the normal operating techniques. The temperature was 307° F. with a 30 second preheat, the chart motor was 60 minutes, and the range selection was 100. Both curves were run on a rubber test formulation as described below utilizing 50 parts per 100 of resin (phr.) of commercial Easy Processing Channel Black, treated with 2% methanol in the formulation described by the upper curve and untreated with methanol in the formulation described by the lower curve.

DESCRIPTION OF THE PREFERRED EMBODIMENTS

(1) Starting materials

Carbon materials—carbon blacks which are suitable starting materials for the present invention include those having pH's below about 7, more preferably below about 6, and most preferably below about 5. Such carbon blacks include channel blacks, e.g., Easy Processing Channel Black, Medium Processing Channel Black, Conductive Channel Black, and oxidized Carbon Blacks, e.g., those of U.S. 3,248,252. Generally from 25 to about 400, more preferably from 40 to 200, and most preferably 50 to 100 parts per weight of carbon black will be employed for each part by weight of elastomer in the finished composition.

Preferably, from about 0.25 to 20, more preferably 0.50 to 5, and most preferably 1 to 4% by weight of methanol is employed, based on the weight of the carbon black.

(2) Elastomers

Vulcanizable elastomers in general may be employed, but preferred among these will be those mentioned above under "Utility" and most preferred are styrene-butadiene copolymer (SBR) and natural rubber, and other sulfur vulcanizable elastomers.

(3) Other ingredients

In general, the other ingredients conventionally employed in conventional vulcanizable elastomer compositions will be employed in their usual amounts except that it may be possible to reduce somewhat the amount of accelerator employed in view of the acceleration of the cure time provided by the methanol of the invention. Under normal circumstances, no reformulation will be required in order to utilize the present invention.

(4) Apparatus

The methanol can be intimately admixed with the carbon blacks in any conventional type of blender or other solid-liquid contacting apparatus. However, V blenders, e.g., those manufactured by Patterson Kelly and ribbon-type blenders, are particualrly convenient. The blenders are operated conventionally, generally with the methanol being sprayed onto the carbon black as it is agitated by the blender. The mixing temperature of the methanol and of the carbon black is not narrowly critical and may be any temperature which does not cause excessive evaporation. After thorough mixing, the excess methanol is removed by conventional evaporation techniques; e.g. heating the blender by running hot water through the jacket.

(5) Examples

The invention will be more fully understood by reference to the following examples which are to be understood as merely illustrative thereof.

EXAMPLE III

The formulations of Examples I and II were separately run on a Monsanto rheometer using 30 second preheat, a temperature of 307° F., 60 minutes chart motor, 100 range selection, 3° arc, and 3 cycles per minute. The results are shown in the enclosed drawing with the methanol treated channel black formulation being described by the upper curve, and the untreated formulation being described by the lower curve.

These results indicate that methanol reduced optimum cure time* from 37.5 minutes to 33.5 minutes and resulted in higher reinforcement as indicated by the higher rheometer curve on the methanol-treated material.

EXAMPLES IV-VI

When the techniques of Examples I and II are repeated using High Abrasive Furnace (HAF) carbon black and Medium Thermal (MT) carbon black, the unaged physical test results performed according to the techniques of ASTM D 412, D 624, D 2240 are as tabulated in Table 1 below.

TABLE I

| Ex. | Carbon black | Percent methanol on carbon black | Optimum cure, min. | Stock | 307° F. cure | Modulus, 300% | Ultimate Tensile | Ultimate Elongation | Set | Shore hard-creep | Die A, tear | Specific gravity |
|---|---|---|---|---|---|---|---|---|---|---|---|---|
| I | Easy processing channel black.[1] | 2% methanol | 33.5 | G6888 | 20 | 1,040 | 3,660 | 690 | 23 | 63-58 | 360 | 1.156 |
|   |   |   |   | 50 | 30 | 1,700 | 3,690 | 530 | 14 | 68-65 | 253 |   |
|   |   |   |   | EC | 50 | 2,050 | 3,480 | 440 | 10 | 69-65 | 219 |   |
| II | do.[1] | No methanol | 37.5 | G6887 | 20 | 770 | 2,710 | 630 | 21 | 61-55 | 500 | 1.163 |
|   |   |   |   | 50 | 30 | 1,480 | 3,490 | 520 | 14 | 68-63 | 331 |   |
|   |   |   |   | EU | 50 | 1,940 | 3,050 | 400 | 9 | 68-63 | 226 |   |
| III | High abrasive furnace black.[2] | 2% methanol | 19.0 | G6890 | 20 | 2,550 | 3,810 | 440 | 13 | 68-65 | 228 | 1.164 |
|   |   |   |   | 50 | 30 | 2,900 | 3,760 | 360 | 8 | 68-65 | 203 |   |
|   |   |   |   | HC | 50 | 3,110 | 3,710 | 360 | 6 | 70-67 | 234 |   |
| IV | do.[2] | No methanol | 18.5 | G6889 | 20 | 2,780 | 3,400 | 360 | 9 | 68-66 | 226 | 1.166 |
|   |   |   |   | 50 | 30 | 3,100 | 3,690 | 360 | 9 | 70-67 | 189 |   |
|   |   |   |   | HU | 50 | 3,250 | 3,650 | 310 | 6 | 71-68 | 190 |   |
| V | Medium thermal[3] | 2% methanol | 21.0 | G6892 | 20 | 680 | 1,640 | 660 | 18 | 56-53 | 153 | 1.233 |
|   |   |   |   | 75 | 30 | 900 | 1,590 | 530 | 12 | 60-58 | 109 |   |
|   |   |   |   | TC | 50 | 980 | 1,450 | 430 | 9 | 60-57 | 105 |   |
| VI | do.[3] | No methanol | 22.0 | G6891 | 20 | 720 | 1,500 | 560 | 13 | 55-52 | 153 | 1.235 |
|   |   |   |   | 75 | 30 | 990 | 1,510 | 460 | 10 | 60-57 | 155 |   |
|   |   |   |   | TU | 50 | 1,040 | 1,460 | 390 | 8 | 60-58 | 122 |   |

[1] pH=5.0.  [2] pH=9.0.  [3] pH=8.5.

EXAMPLE I

According to the present invention, 10 pounds of Easy Processing Channel Black are mixed in a V-type blender with 0.2 pound of methanol at room temperature. After intimate mixing has been accomplished, the methanol-carbon black mixture has a consistency of a dry powder. The excess methanol is evaporated off by running hot (180° F.) water through the jacket.

The Easy Processing Channel Black has a pH of approximately 5.

50 parts of the above carbon black-methanol mixture are then mixed with the following test formulation so as to provide a loading of 50 parts by weight of the channel black per 100 parts of SBR:

| | Parts by weight |
|---|---|
| SBR 1502 | 100.00 |
| Zinc oxide | 5.00 |
| Stearic acid | 2.00 |
| Sulfur | 1.75 |
| Santocure [2 - (2,6 - dimethyl-4-morpholinothiobenzothiozol] | 1.30 |

The resulting stocks were mixed on a laboratory two-roll rubber mill.

EXAMPLE II

For comparative purposes, a composition exactly identical with that of Example I was prepared except the Easy Processing Channel Black was not treated with methanol.

Comparing Example I (2% methanol according to the invention) with Example II (no methanol) shows that the invention reduces the optimum cure time by 4 minutes, increases the ultimate tensile strength by 200 p.s.i., and increases the modulus (at the highest optimum tensile strength) by 220 p.s.i.

Similarly, comparing Example III (high pH carbon black with methanol) with Example IV (no methanol) shows that the methanol accelerates the cure by only ½ minute, increases the ultimate tensile strength by only 70 p.s.i., and actually decreases the modulus, illustrating the importance of choosing low pH carbon blacks for use with the invention.

However, comparison of Example IV (high pH carbon black with methanol) with Example V (no methanol) shows that the methanol reduces the cure time by only 1 minute, increases the tensile strength by only 80 p.s.i., and actually decreases the modulus, further illustrating the importance of selecting low pH carbon blacks.

(6) Modifications of the invention

It should be understood that the invention is capable of a variety of modifications and variations which will be made apparent to those skilled in the art by a reading of the specification and which are to be included within the spirit of the claims appended hereto. For example, the methanol may be added by fluidizing techniques, by

---

*Optimum cure is conventionally calculated as 90% of the rise between the low value on left of rheometer curve and the high value on right.

dumping of batches of carbon black into methanol and then filtering or by other specialized techniques which are convenient to the particular application. Particularly conveniently, the methanol can be mixed in with the water and binder used in a conventional pelleting process.

I claim:

1. In a process for the preparation of elastomeric compositions containing carbon black having a pH of less than 7, the improvement comprising contacting said carbon black with methanol before compounding the methanol-treated carbon black into said elastomeric compositions, wherein the amount of methanol used to contact the carbon black is from .25 to about 20% by weight based on the weight of the carbon black, and is an amount effective to speed vulcanization of said elastomeric compositions.

2. The process of claim 1 wherein the methanol constitutes from about 0.50 to about 5% by weight based on the weight of the carbon black.

3. The process of claim 1 wherein said elastomeric compositions comprise natural rubber.

4. The process of claim 1 wherein said elastomeric compositions comprise styrene-butadiene copolymer.

5. The process of claim 1 wherein said elastomeric compositions comprise ethylene-propylene diolefin terpolymer.

6. The process of claim 1 wherein said elastomeric compositions comprise chlorinated isoprene.

7. The process of claim 1 wherein said elastomeric compositions comprise polybutadiene.

8. A process according to claim 1 additionally comprising evaporating any remaining methanol from said carbon black by application of heat after said contacting.

9. A process according to claim 1 additionally comprising mixing said methanol with water and binder and carbon black pelletizing the resulting mixture and drying the resulting pellets.

References Cited

UNITED STATES PATENTS

| | | | |
|---|---|---|---|
| 3,364,156 | 1/1968 | Kraus | 260—763 |
| 3,023,188 | 2/1962 | Kraus et al. | 106—307 |

OTHER REFERENCES

Kraus, J. Phys. Chem. 59, 343–345 (1955). QD 1 J9.

Avgul et al., Chem. Abs. 50, 646–647 (1956).

ALLAN LIEBERMAN, Primary Examiner

U.S. Cl. X.R.

23—209.2; 106—307; 260—763